SYNCHRONOUS TIMING CIRCUIT

Filed Sept. 11, 1961 2 Sheets-Sheet 1

INVENTOR.
NORMAN R. CRAIN
BY William C. Cahill
ATTORNEY

SYNCHRONOUS TIMING CIRCUIT

Filed Sept. 11, 1961 2 Sheets-Sheet 2

INVENTOR.
NORMAN R. CRAIN
BY William C. Cahill
ATTORNEY

United States Patent Office 3,163,824

Patented Dec. 29, 1964

3,163,824

SYNCHRONOUS TIMING CIRCUIT

Norman R. Crain, Phoenix, Ariz., assignor to General Electric Company, a corporation of New York Filed Sept. 11, 1961, Ser. No. 137,405

10 Claims. (Cl. 328—58)

This invention pertains to timing devices, and more particularly, to electronic timing circuits.

Electronic timing circuits of the prior art frequently take the form of a monostable circuit, commonly referred to as a "one-shot." These monostable circuits characteristically utilize a pair of tubes or transistors cross-coupled in such a manner that, under normal operating conditions, only one of the devices is conducting. Upon receipt of an input signal to the one-shot, the transistor or tube that is non-conducting begins to conduct, and the conducting tube or transistor ceases to conduct. The two devices are usually cross coupled with a capacitor which, under quiescent conditions, is fully charged. When the one-shot is triggered, the charge on the capacitor decays, and as the voltage existing across the capacitor decreases, the one-shot is returned to the quiescent state.

Thus, the usual prior art one-shot will remain in a quiescent condition with one of two tubes or transistors conducting; upon receipt of an appropriate trigger signal to the one-shot, the conduction of the then conducting transistor or tube will cease, and the other tube or transistor will begin conducting. During this latter time, referred to as the unstable state, a timing capacitor, previously charged, will discharge. When the capacitor is sufficiently discharged, the one-shot will be returned to its quiescent or stable state. The one-shot will therefore provide an output signal at a predetermined time after a triggering signal has been applied thereto, the delay time depending on the RC time constant of the capacitor discharge circuit.

One important application of one-shot circuits is in digital computing apparatus. In such applications, a centralized timing system, or clock system, provides synchronization throughout the computer to enable signals representing binary digits to be manipulated. These binary digits or "bits" are usually characterized by a given voltage, or, "logic level." For example, a positive 6 volts may be interpreted by the computer as an existing bit; whereas, a —5 volts may be interpreted by the computer as an absence of a binary bit. Stated differently, the positive 6 volt level on a given conductor may represent a binary "1," and the negative 5 volts on the conductor may represent the absence of a binary "1." A corresponding conductor may be provided for the representation of the presence or absence of a binary "0."

One-shots utilized in computing apparatus are usually triggered by logic levels of the type described above. Upon receipt of the appropriate logic level, the one-shot will assume an unstable state for a predetermined time; however, since the time delay of the one-shot depends solely on the RC time constant of the one-shot circuit, the timed output of the one-shot will occur asynchronously. For example, the triggering signal or logic level applied to the one-shot will occur in synchronism with the computer clock system, and the one-shot will begin the timing cycle. When the timing period has ended, and the timing signal provided by the one-shot ends, the end of the timing period will usually occur at other than a clock pulse from the computer system. Since the timing signal from the one-shot is asynchronous, it is necessary to resynchronize the signal prior to further utilization in the computer.

It is also frequently desirable, in computer applications of one-shots, to have a "timing start signal"; that is, a signal from the one-shot, of predetermined duration, indicating that the timing cycle of the one-shot has been instigated, and the one-shot is in the unstable state.

Accordingly, it is an object of the present invention to provide an improved timing circuit.

It is another object of the present invention to provide a timing circuit having an adjustable time delay.

It is another object of the present invention to provide a timing circuit having an output signal that is synchronized.

It is also an object of the present invention to provide a timing circuit that yields a timing start signal when a timing period is begun.

It is still another object of the present invention to provide a timing circuit having a synchronized timing signal output and a synchronized timing start signal output.

Further objects and advantages of the present invention will become apparent to those skilled in the art as the description thereof proceeds.

Briefly stated, in accordance with one aspect of the present invention, a timing circuit is provided that is responsive to a predetermined logic level triggering signal for yielding a predetermined time delay. A first circuit is provided having a timing capacitor and an adjustable resistance in series therewith to form a variable RC circuit. When the first circuit receives the triggering signal, the previously charged timing capacitor discharges, and provides a predetermined delay. At the end of the delay period, the first circuit assumes a stable state, and remains in the stable state until another triggering signal is received. During the unstable state, a second circuit assumes one of two stable states, and provides an output signal that is synchronized with synchronizing signals applied to the timing circuit. When the first circuit assumes its stable state, the second circuit assumes the second stable state, and remains in that state until another triggering signal is applied to the first circuit. Means are provided for sensing the unstable state of the first circuit, and for generating a timing start signal when the first circuit is triggered.

The invention, both as to its organization and operation, together with further objects and advantages thereof may best be understood by reference to the following description taken in connection with the accompanying drawings in which.

Figure 1:
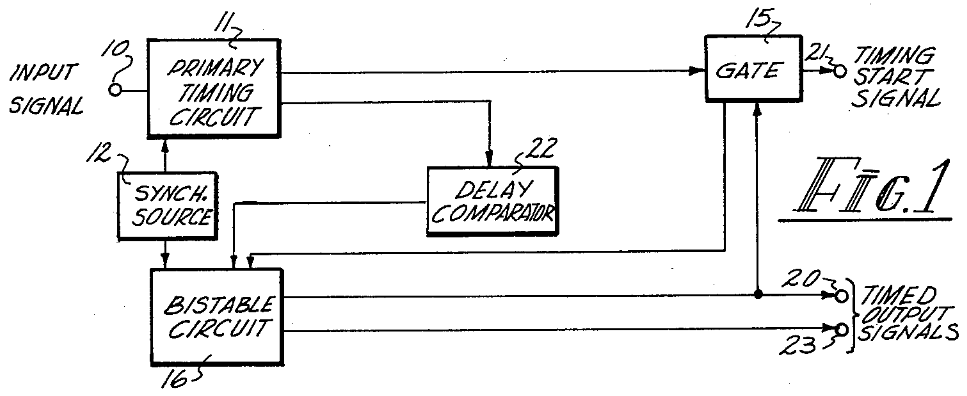
FIG. 1 is a block diagram illustrating an embodiment of the present invention.
Figure 2:
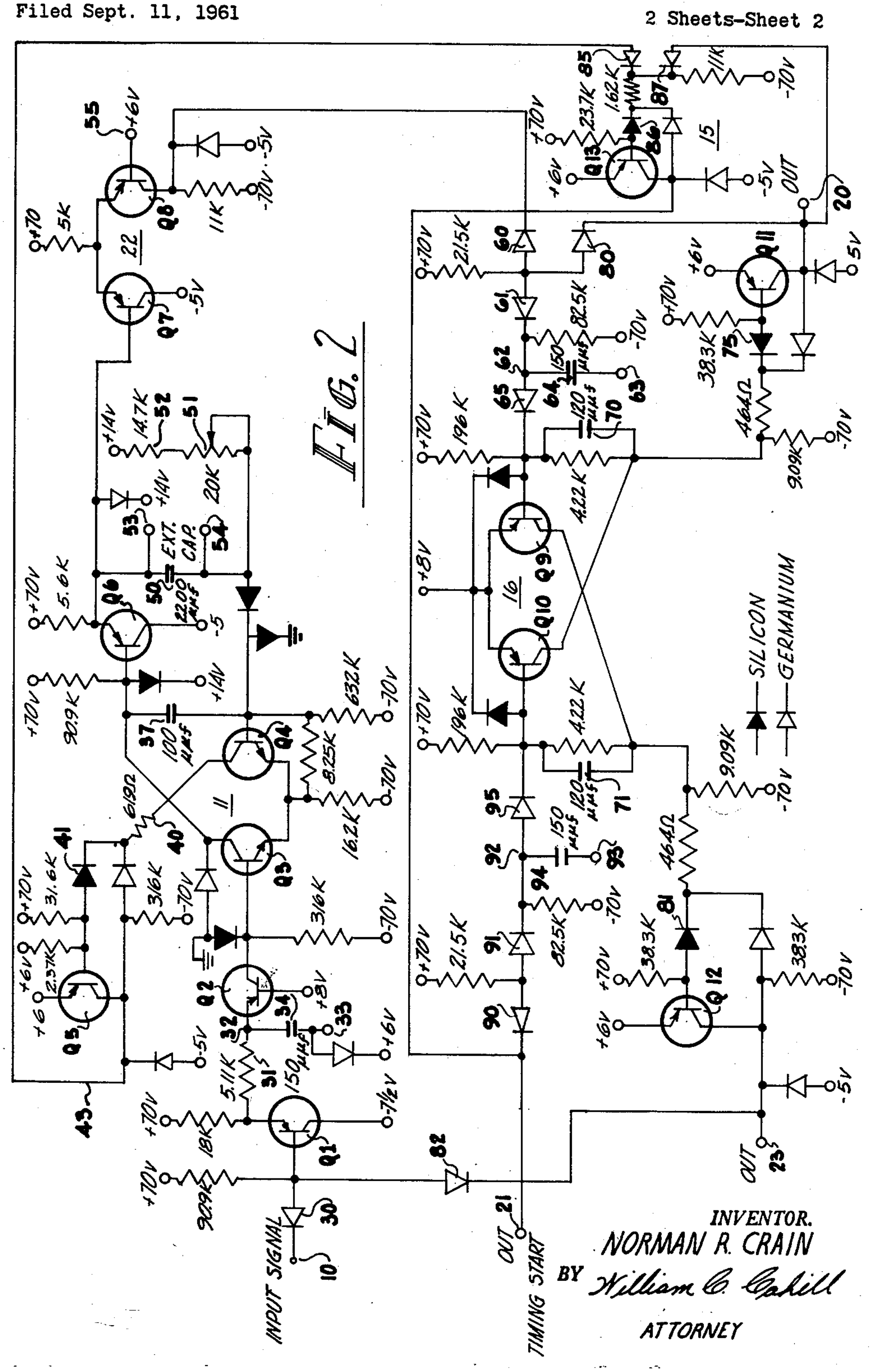
FIG. 2 is a schematic circuit diagram of the embodiment shown in FIG. 1.

Referring to FIG. 1, a block diagram of the present invention is shown to provide an introduction to the circuit of diagram of FIG. 2. A terminal 10 is provided to receive an input signal. A primary timing circuit 11 receives the input signal applied to terminal 10 and assumes an unstable state. To provide synchronization of the initiation of the timing period, the primary timing circuit 11 will not assume an unstable state until a synchronizing signal from a synchronizing source 12 is received. The synchronizing source 12 may be the clock system of a computing system in which the present invention may be utilized. Upon assuming an unstable state, primary timing circuit 11 provides a timing signal to an electronic gate 15. The gate 15 immediately provides a triggering signal to a bistable circuit 16. The bistable circuit assumes one of two stable states upon the simultaneous receipt of a triggering signal from the gate 15 and a synchronizing signal from the synchronizing source 12. The bistable circuit 16 provides timed output signals at terminals 20 and 23. The timed output signal available at terminal 20 is fed back to the gate 15 to turn the latter off. Thus, during the interval between the generation of a timing signal by the primary timing circuit 11 and the timed output signal from the bistable circuit 16, the gate 15 provides a timing start signal at terminal 21. The timing start signal will thus occur immediately upon the initiation of the timing cycle by the primary timing circuit, and will cease as soon as the bistable circuit assumes the first stable state.

The circuit represented by FIG. 1 will thus remain in the state described, with timed output signals available at terminals 20 and 23, for the duration of the timing interval of the primary timing circuit 11. When the primary timing circuit 11 returns to its stable state, a delay-comparator 22 senses the return of the primary timing circuit to its stable state, and provides a delayed voltage comparison as will be described more fully hereinafter, and initiates a triggering signal for the bistable circuit 16. Upon receipt of the triggering signal from the delay-comparator 22, and a synchronizing signal from the synchronizing source 12, the bistable circuit 16 will assume a second stable state and provide timed output signals at terminals 20 and 23. Thus, an input signal applied to the terminal 10 of the synchronous timing circuit of FIG. 1, will provide a timing start signal at terminal 21 which will indicate that the timing circuit has initiated its timing cycle, and that the primary timing circuit is in its unstable state; further, the synchronous timing circuit will provide synchronized timed output signals at terminals 20 and 23.

Referring now to FIG. 2, a more complete description of an embodiment of the present invention will be given. A terminal 10 is provided for receiving input signals to initiate the timing cycle. Input terminal 10 is connected through a diode 30 to transistor Q1. Transistor Q1 provides amplification for the input signal prior to the application of the signal to the primary timing circuit 11. The emitter of transistor Q1 is connected through a suitable resistance 31 to junction 32. A terminal 33 is provided for the receipt of a synchronizing signal from a synchronizing source; the terminal 33 is connected to junction 32 through a coupling capacitor 34. Transistor Q2 is emitter-connected to the junction 32, and provides isolation of the input circuitry from the primary timing circuit 11.

The primary timing circuit 11 comprises a pair of transistors Q3 and Q4 collector-to-base coupled through coupling capacitor 37. The emitters of transistors Q3 and Q4 are connected together and to a suitable source of bias potential. The collector electrode of transistor Q4 is connected, through resistor 40 and diode 41 to the base of a primary timing circuit output transistor Q5. The collector electrode of transistor Q5 is connected to conductor 43 for providing the synchronous timing circuit with a timing signal from the primary timing circuit 11.

The collector electrode of transistor Q3 is connected to the base of a recharging transistor Q6. The transistor Q6 is emitter-follower connected to a RC timing circuit comprising a timing capacitor 50, variable resistor 51, and fixed resistor 52. The value of the RC time constant may be varied by varying the tap position on variable resistor 51 and by adding additional timing capacitors to the external capacitor terminals 53 and 54. The emitter electrode of transistor Q6 is also connected to the base electrode of transistor Q7 of the delay-comparator circuit 22. The delay-comparator circuit 22 includes transistors Q7 and Q8 having their emitters joined together and to a suitable source of bias potential; the base electrode of transistor Q8 is connected to a terminal 55 for receiving a standard potential (shown in FIG. 2 as +6 volts).

The collector electrode of transistor Q8 is connected, through diodes 60 and 61 to junction 62. A terminal 63 is provided for the receipt of a synchronizing signal, and is connected to the junction 62 through a coupling capacitor 64. Junction 62 is connected through a diode 65 to the base electrode of a transistor Q9 of the bistable circuit 16. The bistable circuit 16 includes transistors Q9 and Q10, collector-base connected through coupling capacitors 70 and 71. The emitter electrodes of transistors Q9 and Q10 are joined together and to a suitable source of bias potential. The collector electrode of transistor Q10 is connected through a diode 75 to the base electrode of a transistor Q11. The collector electrode of transistor Q11 is connected to the output terminal 20 to provide a timed output signal. The signal present at the output terminal 20 is fed back through diode 80 to junction 62 at the input to the bistable circuit 16.

The collector electrode of transistor Q9 is connected through diode 81 to the base electrode of transistor Q12. The collector electrode of transistor Q12 is connected to an output terminal 23 to provide a second timed output signal. The output signal present at terminal 23 is fed back through diode 82 to the base electrode of transistor Q1 to inhibit further triggering until the bistable circuit can return to its initial state.

The timing signal present on conductor 43, presented by the primary timing circuit 11, is applied to the base electrode of transistor Q13 through diodes 85 and 86 of gating circuit 15. The output signal existing at terminal 20 is also applied to the gating circuit 15 through diode 87.

The collector electrode of transistor Q13 is connected through diodes 90 and 91 to junction 92. A terminal 93 is provided for the receipt of synchronizing pulses and is coupled to the junction 92 through a coupling capacitor 94. Junction 92 is connected to the base electrode of transistor Q10 through diode 95. The collector electrode of transistor Q13 is also connected to an output terminal 21 to provide a timing start signal.

The description of the operation of the circuit shown in FIG. 2 will now be given. To facilitate the description of the operation of the circuit, it will be assumed that the circuit is initially in the quiescent condition, that is, the synchronous timing circuit has not been triggered into a timing cycle. For convenience, it will also be assumed that the logic levels involved will be a positive 6 volts. The circuit values shown are chosen as representative, and may vary greatly depending on the logic levels desired. Thus, the output signals provided by the synchronous timing circuit of FIG. 2, and the signals to which the timing circuit is responsive, will be signals of either a positive 6 or a negative 5 volts. The description of operation may also be facilitated by reference to the timing diagram shown in FIG. 3.

Under quiescent conditions, the voltage presented at terminal 10 of the synchronous timing circuit is at a −5 volt level, the output signal presented at terminal 23 is at a positive 6 volt level, the output signal provided at terminal 20 is at a negative 5 volt level, and the output signal provided at terminal 21 is at a negative 5 volt level. Since a negative 5 volts exists at the input terminal 10, diode 30 is forward biased, and transistor Q1 conducts. Thus, the potential at junction 32 is insufficient to cause transistor Q2 to conduct; therefore, transistor Q3 is also non-conducting by virtue of the negative bias potential applied to the base electrode thereof. In the quiescent condition, transistor Q4 is conducting, and the emitter-collector current maintains a sufficiently low potential at the base electrode of transistor Q5 to maintain the latter conducting. Since the bias potential at the emitter electrode of transistor Q5 is a positive 6 volts, and since transistor Q5 is conducting, the potential existing on conductor 43 is a positive 6 volts. When transistor Q3 is non-conducting, the cross coupling capacitor 37 is charged to a value just greater than the 14 volt potential by the amount of forward drop developed by the silicon diode. The emitter of Q6 is, at this time, more positive than the 14 volt potential by the amount of forward drop developed by the germanium diode. Thus, the base electrode of transistor Q6 is sufficiently positive to maintain Q6 non-conducting. When transistor Q6 is non-conducting, a charging potential connected to the emitter electrode thereof charges the timing capacitor 50. The charging potential existing across charging capacitor 50 is clamped at a positive 14 volts.

This 14 volt level is applied to the base electrode of transistor Q7. Since transistors Q7 and Q8 are supplied from a common biasing potential to the emitter electrodes thereof, and since the base potential on transistor Q8 is at a standard potential of +6 volts, the 14 volts at the base electrode of transistor Q7 causes transistor Q8 to conduct, thus presenting a positive 6 volt level to diode 60. Since, as has been stated, the output existing at terminal 20 is at a negative 5 volt level, the diode 80 is forward biased to the −5 volt level, and the potential applied to the diode 61 clamps the latter to −5 volts.

Transistor Q9 is held in a non-conducting state by the relatively positive voltage applied to the base electrode thereof. Transistor Q10 is conducting, and the positive 8 volt level applied to the emitter electrode thereof is connected through the collector electrode and diode 75 to the base electrode of transistor Q11. Therefore, transistor Q11 is held in the non-conducting state, and the −5 volt clamping voltage applied to collector electrode thereof provides the −5 volt logic level at the output terminal 20. When transistor Q9 is non-conducting, the base electrode of transistor Q12 is sufficiently negative with respect to the emitter electrode thereof that transistor Q12 will conduct. Thus, the positive 6 volt bias supply applied to the emitter electrode of transistor Q12 is transmitted to the output terminal 23 to provide the appropriate logic level.

As stated previously, the voltage existing on conductor 43 is at a positive 6 volt level, and is applied to the gate circuit 15 through diode 85; similarly, the negative 5 volt level existing at terminal 20 is applied to the gating circuit through diode 87. Since diode 85 is clamped to a +6 volts by conductor 43, a relatively positive potential is applied to the diode 86 to cause it to become clamped at +6 volts. Thus, the base electrode of transistor Q13 remains at a relatively positive potential with respect to the emitter electrode thereof, and the transistor remains non-conducting. When transistor Q13 is non-conducting, the −5 volt clamping voltage at the collector electrode thereof maintains the bistable circuit 16 in the quiescent state (Q10 conducting, Q9 non-conducting), and provides a −5 volt level to the output terminal 21.

Figure 3:
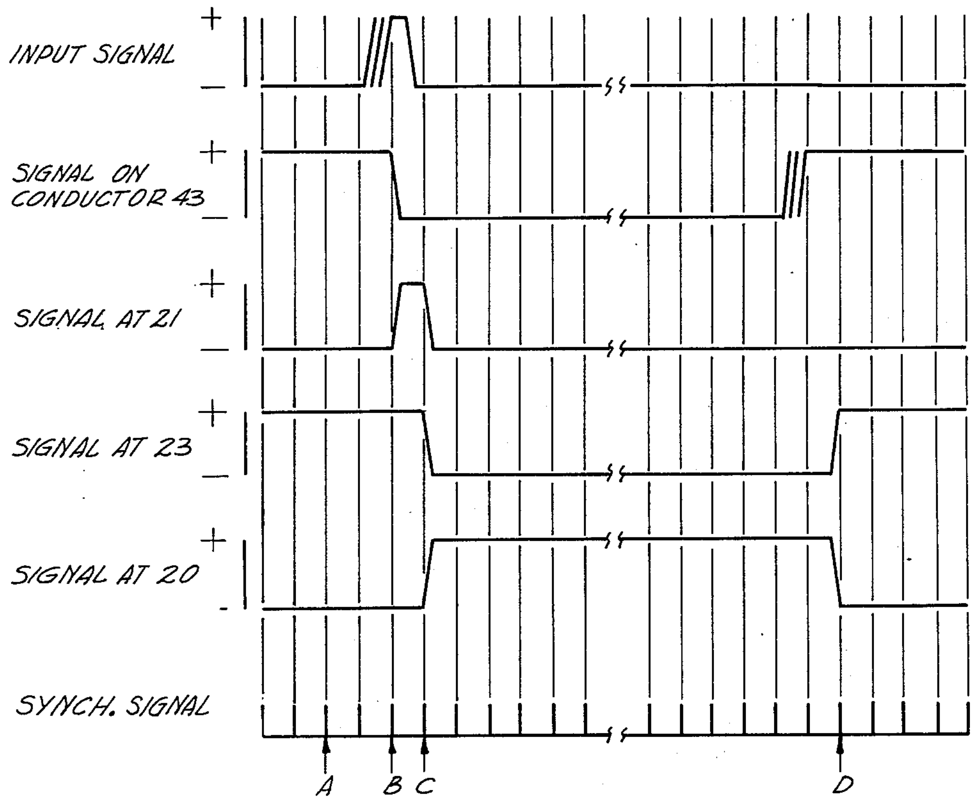
FIG. 3 is a simplified timing diagram illustrating voltage levels at various points in the circuit of FIG. 2.

Thus, the quiescent condition of the synchronous timing circuit may be defined by a reference to the timing diagram of FIG. 3, at point A. That is, the signal applied to the input terminal is at a negative 6 volt level, the signals at terminals 20 and 21 are at negative 5 volt levels, and the signal at terminal 23 is at a positive 6 volt level while the signal on conductor 43 is also a positive 6 volt level.

When a positive logic level (+6 volts) is applied at the input terminal 10, diode 30 becomes clamped at +6 volts, and since diode 82 is already clamped at +6 volts, the potential existing at the emitter electrode of transistor Q1 rises correspondingly, thus causing the potential at junction 32 to rise. However, the increased potential at junction 32 is not enough to cause transistor Q2 to conduct. To cause conduction of transistor Q2, the increased potential at junction 32, caused by the positive 6 volt logic input to terminal 10, is combined with a synchronizing signal applied to terminal 33 and coupled to junction 32 through coupling capacitor 34. The superimposed voltages provided by the conduction of transistor Q1 and the synchronizing voltage applied to terminal 33 are sufficient to cause transistor Q2 to conduct. When transistor Q2 conducts, the base electrode of transistor Q3 rises, and transistor Q3 begins to conduct.

As transistor Q3 begins conduction, the potential at the collector electrode thereof experiences a sudden drop, which is transmitted through the coupling capacitor 37 to the base electrode of transistor Q4. The reduction in the voltage at the base electrode of transistor Q4 reduces the current flowing in the emitter-collector circuit of transistor Q4, providing an additional forward biasing for transistor Q3. The turning on of transistor Q3 and the turning off of transistor Q4 is a regenerative action which causes the conduction to switch from one transistor to the other very rapidly. When transistor Q4 ceases conducting, the base electrode of transistor Q5 rises, and transistor Q5 ceases to conduct; the −5 volt clamping voltage provided to the conductor 43, and the non-conduction of transistor Q5, cause the voltage on conductor 43 to drop from a positive 6 volt level to a −5 volt level. When conductor 43 is at a −5 volt level, diode 86 is no longer clamped at +6 volts, and the potential existing at the base electrode of transistor Q13 drops sufficiently to cause conduction in the emitter-collector circuit thereof. Thus, the potential of the collector circuit of transistor Q13 rises to a positive 6 volt level, and this positive 6 volt level is applied to the output terminal 21 to provide a timing start signal. The operation of the circuit of FIG. 2 at this instant is demonstrated by point B of FIG. 3 where it may be seen that the input signal applied to terminal 10 (asynchronously) causes the voltage on conductor 43 to drop from a positive 6 volts to a −5 volts, and the signal presented at terminal 21 to rise from a −5 volts to a +6 volts, all at the next succeeding synchronizing signal received after the input signals applied to terminal 10.

When the collector circuit of transistor Q13 rises to a positive 6 volt level, diode 90 becomes clamped to +6 volts thus raising the potential at junction 92. The increased potential caused by the conduction of transistor Q13 is superimposed at junction 92 with a synchronizing signal applied at terminal 93 and through coupling capacitor 94. The superimposed voltages are sufficient to raise the potential of the base electrode of transistor Q10 through diode 95 and cause the transistor Q10 to cease conducting. As the transistor Q10 begins to shut off, the negative-going voltage at the collector electrode thereof is transmitted through the coupling capacitor 70 to the base electrode of transistor Q9. This negative going voltage at the base electrode of transistor Q9 rapidly turns transistor Q9 on which, in turn, causes a positive going voltage to be applied to the base electrode of transistor Q10 through coupling capacitor 71. The result of the cross-coupling action causes a rapid turn off of transistor Q10 and rapid turn on of transistor Q9. When transistor Q9 conducts, the positive potential existing at the emitter electrode thereof is applied through the collector electrode to diode 81 to clamp the latter to the collector voltage and cause the potential at the base electrode of transistor Q12 to rise. The increased potential at the base electrode of transistor Q12 causes the latter to turn off, and the voltage existing at output terminal 23 to drop to the clamping voltage level of −5 volts. Simultaneously with the turning off of transistor Q12, the turning off of transistor Q10 causes the base electrode voltage of transistor Q11 to drop, resulting in the turning on of transistor Q11 and the rising of the potential existing at the output terminal 20 to a positive 6 volt level. The positive 6 volts, now existing at output terminal 20 is coupled through diode 87 to diode 86 to clamp the latter to +6 volts and cause the base electrode potential of transistor Q13 to rise. The rise in the base electrode potential causes transistor Q13 to cease conducting, thereby resulting in a drop in potential of the collector electrode thereof from a positive 6 volts to the negative 5 volt clamping level. As the result of the fall in the potential of the collector electrode of transistor Q13, the output voltage existing at terminal 21 returns to the −5 volt level.

When transistor Q3 conducts, the voltage at the base electrode of transistor Q6 drops, and transistor Q6 is turned on. When transistor Q6 is turned on, a discharge path is provided for the timing capacitor 50 (and any external timing capacitors connected between terminals 53 and 54). The discharge path exists through resistors 52 and 51, to one side of the capacitor, and from the other side of the capacitor, through the emitter-collector circuit of transistor Q6 to the −5 volt collector bias potential. The resulting drop in the emitter voltage of transistor Q6, and the corresponding drop in the base electrode voltage of transistor Q7 causes transistor Q7 to begin conduction which, in turn, turns transistor Q8 off. When transistor Q8 is turned off, the collector circuit is clamped to a −5 volts thus lowering the potential of the junction between diodes 60 and 61. The conditions existing in the synchronous timing circuit of FIG. 2 at this instant may be demonstrated by point C in the timing diagram of FIG. 3 wherein it is shown that the timing start signal existing at terminal 21 has returned to a negative 5 volts, the signal present at output terminal 23 has dropped from a positive 6 to a negative 5 volts, and the output signal present at output terminal 20 has risen from a −5 volts to a +6 volts. As a result of the positive input signal at terminal 10, the synchronous timing circuit has thus far presented a timing start pulse having a duration of one synchronous period, or clock period, and has presented a negative signal at a normally positive terminal and a positive signal at a normally negative terminal.

The circuit thus remains in this state until the charging capacitor 50 has been partially discharged, and the primary timing circuit has returned to its stable state. When timing capacitor 50 begins to discharge, the potential existing at the base electrode of transistor Q4 "floats"; that is, while the potential across the timing capacitor decays according to the RC time constant of the discharge circuit, the potential at the base electrode of transistor Q4 drops rapidly to approximately 14 volts below ground. As a consequence, transistor Q4 is maintained in the off condition for the discharge period of the timing capacitor 50. However, as the potential at the base electrode rises, while capacitor 50 discharges, transistor Q4 begins to conduct. The beginning of conduction of transistor Q4 reduces the current flowing in the emitter-collector circuit of transistor Q3; as a result of the reduced current through transistor Q3, the collector voltage thereof rises. As a result of this action, transistor Q3 is turned off and transistor Q4 is turned on. When transistor Q3 turns off, the potential at the collector electrode thereof rises, thus raising the potential at the base electrode of transistor Q6 and turning the latter off. When transistor Q6 turns off, the discharge path for timing capacitor 50 is interrupted, and a charging potential is applied thereto. As the potential on capacitor 50 rises, and the capacitor becomes charged, the base voltage existing at the base electrode of transistor Q7 rises, and when this voltage exceeds approximately 6 volts (the base electrode voltage of transistor Q8), transistor Q7 turns off, and transistor Q8 turns on.

The delay-comparator circuit 22 prevents the triggering of the bistable circuit 16 until the gate 15 is turned off by a negative 5 volt level on conductor 43. The delay comparator 22 thus prevents the gate circuit 15 from generating a second timing start signal when the bistable circuit 16 is returned to the original quiescent state. The delay is caused by the charging time required to charge the timing capacitor to a particular voltage (+6 volts in the case chosen for illustration); since, during the timing period, transistor Q7 is conducting, conduction will not be switched to transistor Q8 until the charging potential on timing capacitor 50 exceeds the positive 6 volts applied to the base electrode of transistor Q8.

As transistor Q4 turns on, and the primary timing circuit 11 assumes its stable state, current flows through diode 41 thus lowering the potential at the base electrode of transistor Q5 and turning the latter on. When transistor Q5 conducts, the collector voltage rises to approximately a positive 6 volts thus raising the voltage on conductor 43 to a positive 6 volt level. Thus, the potential on conductor 43 is at a positive 6 volt level, the voltage at the base electrode of transistor Q13 will rise, and Q13 is maintained in the non-conducting state which, in turn, maintains the voltage at output terminal 21 at a −5 volt level. When transistor Q8 conducts, and raises the potential of its collector electrode circuit to a positive 6 volt level, diode 60 becomes clamped to +6 volts. Since diode 80 is clamped to +6 volts by the positive 6 volt level from the collector electrode circuit of transistor Q11, diode 61 will also become clamped to +6 volts and will cause the potential at junction 62 to rise. The superimposed potential existing at junction 62 (superimposed on a synchronizing signal applied at terminal 63 and coupled to junction 62 through coupling capaictor 64) will sufficiently raise the base electrode of transistor Q9 to cause it to start to turn off. The regenerative action between transistors Q9 and Q10 causes transistor Q9 to turn off and transistor Q10 to turn on. When transistor Q10 turns on, the potential at the base electrode of transistor Q11 rises, and the latter becomes non-conducting; therefore, the voltage presented at the output terminal 20 becomes clamped to the −5 volt logic level. Correspondingly, with the turn off of transistor Q9, the voltage at the base electrode of transistor Q12 is lowered, and transistor Q12 begins conducting. As a result of the conduction of transistor Q12, the output terminal voltage at terminal 23 is raised to a positive 6 volt level.

The conditions now existing at the various locations in the circuit of FIG. 2 are illustrated by the timing diagram of FIG. 3 at point D. Referring to FIG. 3, it may be seen that at point D the input signal has remained at a −5 volt level, while the signal present on conductor 43 has risen to the positive 6 volt level (asynchronously). The output signal at terminal 21 remains at a −5 volt level. Similarly, the output voltages available at terminals 20 and 23 have changed from a positive 6 volts to a −5 volts, and from a −5 volts to a positive 6 volts respectively. Thus, an application of a positive 6 volt level to the input terminal 10 of the synchronous timing circuit of FIG. 2 has resulted in the generation of a timing start signal comprising a pulse having a duration equal to a single synchronizing period, and has presented two output signals each synchronized with appropriate synchronizing signals, and which remain at their respective levels to return to their respective original levels in synchronism with synchronizing signals received from a synchronizing source such as a clock system of a digital computer.

While the principles of the invention have now been made clear in illustrative embodiments, there will be immediately obvious to those skilled in the art many modifications in structure, arrangement, proportions, the elements, materials and components, used in the practice of the invention, and otherwise, which are particularly adapted for specific environments and operating requirements, without departing from those principles. The appended claims are, therefore, meant to cover and embrace any such modifications, within the limits only of the true spirit and scope of the invention.

What is claimed as new and desired to secure by Letters Patent of the United States is:

1. A synchronous timing circuit comprising, a first circuit means having a stable and an unstable state, said first circuit means responsive to signals applied thereto for assuming said unstable state for a predetermined time independent of the duration of said signals and for generating a timing signal during said predetermined time, a second circuit means responsive to a first triggering signal for assuming a first stable state and responsive to a second triggering signal for assuming a second stable state, means responsive to said first and second stable states for providing, respectively, a first and a second output signal, gating means responsive to said timing signal for applying a first triggering signal to said second circuit, and means responsive to the stable state of said first circuit means for applying a second triggering signal to said second circuit means.

2. A synchronous timing circuit comprising, a first circuit means having a stable and an unstable state, said first circuit means responsive to a plurality of signals, simultaneously applied thereto, for assuming said unstable state for a predetermined time independent of the duration of said signals and for generating a timing signal during said predetermined time, second circuit means responsive to a first triggering signal for assuming a first stable state and responsive to a second triggering signal for assuming a second stable state, means responsive to said first and second stable states for providing, respectively, a first and a second output signal, gating means responsive to said timing signal for applying a first triggering signal to said second circuit means, and means responsive to the stable state of said first circuit means for applying a second triggering signal to said second circuit means.

3. A synchronous timing circuit comprising, a first circuit means including a timing capacitor, a source of charging potential for charging said timing capacitor, means responsive to signals applied thereto for discharging said capacitor through a resistance to provide a predetermined time delay independent of the duration of said signals, means responsive to said time delay for providing a timing signal, a second circuit means responsive to a first triggering signal for assuming a first stable state and responsive to a second triggering signal for assuming a second stable state, means responsive to said first and second stable states for providing, respectively, a first and a second output signal, gating means responsive to said timing signal for applying a first triggering signal to said second circuit means, and means responsive to the charged condition of said timing capacitor for applying a second triggering signal to said second circuit means.

4. A synchronous timing circuit for receiving an input signal and providing timed output signals in response thereto comprising, a source of synchronizing signals, a first circuit means having a stable and an unstable state, said first circuit means responsive to the simultaneous receipt of an input signal and a synchronizing signal applied thereto for assuming said unstable state for a predetermined time independent of the duration of said input signal and for generating a timing signal during said predetermined time, a second circuit means responsive to a first triggering signal for assuming a first stable state and responsive to a second triggering signal for assuming a second stable state, means responsive to said first and second stable states for providing, respectively, a first and a second output signal, gating means responsive to said timing signal for applying a first triggering signal to said second circuit means, and means responsive to the stable state of said first circuit means for applying a second triggering signal to said second circuit means.

5. A synchronous timing circuit for receiving an input signal and providing timed output signals in response thereto comprising, a source of synchronizing signals, a first circuit means including a timing capacitor, a source of charging potential for charging said timing capacitor, means responsive to the simultaneous receipt of an input signal and a synchronizing signal for discharging said capacitor through a resistance to provide a predetermined time delay independent of the duration of said input signal, means responsive to said time delay for providing a timing signal, a second circuit means responsive to a first triggering signal for assuming a first stable state and responsive to a second triggering signal for assuming a second stable state, means responsive to said first and second stable states for providing, respectively, a first and a second output signal, gating means responsive to said timing signal for applying a first triggering signal to said second circuit means, and means responsive to the charged condition of said timing capacitor for applying a second triggering signal to said second circuit means.

6. A synchronous timing circuit comprising, a first circuit means including a timing capacitor, a source of charging potential for charging said timing capacitor, means responsive to signals applied thereto for discharging said capacitor through a resistance to provide a predetermined time delay, means responsive to said time delay for providing a timing signal, a second circuit means responsive to a first triggering signal for assuming a first stable state and responsive to a second triggering signal for assuming a second stable state, means responsive to said first and second stable states for providing, respectively, a first and a second output signal, gating means responsive to said timing signal for applying a first triggering signal to said second circuit means, a source of standard potential, comparing means for comparing said standard potential to the potential on said timing capacitor and for applying a second triggering signal to said second circuit means when the latter potential exceeds the former.

7. A synchronous timing circuit for receiving an input signal and providing timed output signals in response thereto comprising, a first circuit means including a timing capacitor, a source of charging potential for charging said timing capacitor, means responsive to the receipt of an input signal for discharging said capacitor through a resistance to provide a predetermined time delay, means responsive to said time delay for providing a timing signal, a second circuit means responsive to a first triggering signal for assuming a first stable state and responsive to a second triggering signal for assuming a second stable state, means responsive to said first and second stable states for providing, respectively, a first and a second output signal, gating means responsive to said timing signal for applying a first triggering signal to said second circuit means, a source of standard potential, comparing means for comparing said standard potential to the potential on said timing capacitor following said time delay and for applying a second triggering signal to said second circuit means when the latter potential exceeds the former.

8. A synchronous timing circuit for receiving an input signal and providing timed output signals in response thereto comprising, a source of synchronizing signals, a first circuit means having a stable and an unstable state, said first circuit means responsive to the simultaneous receipt of an input signal and a synchronizing signal applied thereto for assuming said unstable state for a predetermined time and for generating a timing signal during said predetermined time, a second circuit means responsive to the simultaneous receipt of a first triggering signal and a synchronizing signal for assuming a first stable state and responsive to the simultaneous receipt of a second triggering signal and a synchronizing signal for assuming a second stable state, means responsive to said first and second stable states for providing, respectively, a first and a second output signal, gating means responsive to said timing signal for applying a first triggering signal to said second circuit means, and means responsive to the stable state of said first circuit means for applying a second triggering signal to said second circuit means.

9. A synchronous timing circuit for receiving an input signal and providing timed output signals in response thereto comprising, a source of synchronizing signals, a first circuit means including a timing capacitor, a source of charging potential for charging said timing capacitor, means responsive to the simultaneous receipt of an input signal and a synchronizing signal for discharging said capacitor through a resistance to provide a predetermined itme delay, means responsive to said time delay for providing a timing signal, a second circuit means responsive to the simultaneous receipt of a first triggering signal and a synchronizing signal for assuming a first stable state and responsive to the simultaneous receipt of a second triggering signal and a synchronizing signal for assuming a second stable state, means responsive to said first and second stable states for providing, respectively, a first and a second output signal, gating means responsive to said timing signal for applying a first triggering signal to said second circuit means, and means responsive to the charged condition of said timing capacitor for applying a second triggering signal to said second circuit.

10. A synchronous timing circuit for receiving an input signal and providing timed output signals in response thereto comprising, a source of synchronizing signals, a first circuit means including a timing capacitor, a source of charging potential for charging said timing capacitor, means responsive to the simultaneous receipt of an input signal and a synchronizing signal for discharging said capacitor through a resistance to provide a predetermined time delay, means responsive to said time delay for providing a timing signal, a second circuit means responsive to the simultaneous receipt of a first triggering signal and a synchronizing signal for assuming a first stable state and responsive to the simultaneous receipt of a second triggering signal and a synchronizing signal for assuming a second stable state, means responsive to said first and second stable states for providing, respectively, a first and a second output signal, gating means responsive to said timing signal for applying a first triggering signal to said second circuit means, a source of standard potential, comparing means for comparing said standard potential to the potential on said timing capaictor following said time delay and for applying a second triggering signal to said second circuit means when the latter potential exceeds the former.

References Cited in the file of this patent

UNITED STATES PATENTS

| | | |
|---|---|---|
| 2,816,237 | Hageman | Dec. 10, 1957 |
| 2,930,906 | Wolfe | Mar. 29, 1960 |
| 2,987,632 | Milford | June 6, 1961 |